Jan. 26, 1965 J. REINES ETAL 3,167,746
SPECIMEN IDENTIFICATION METHODS AND APPARATUS
Filed Sept. 20, 1962
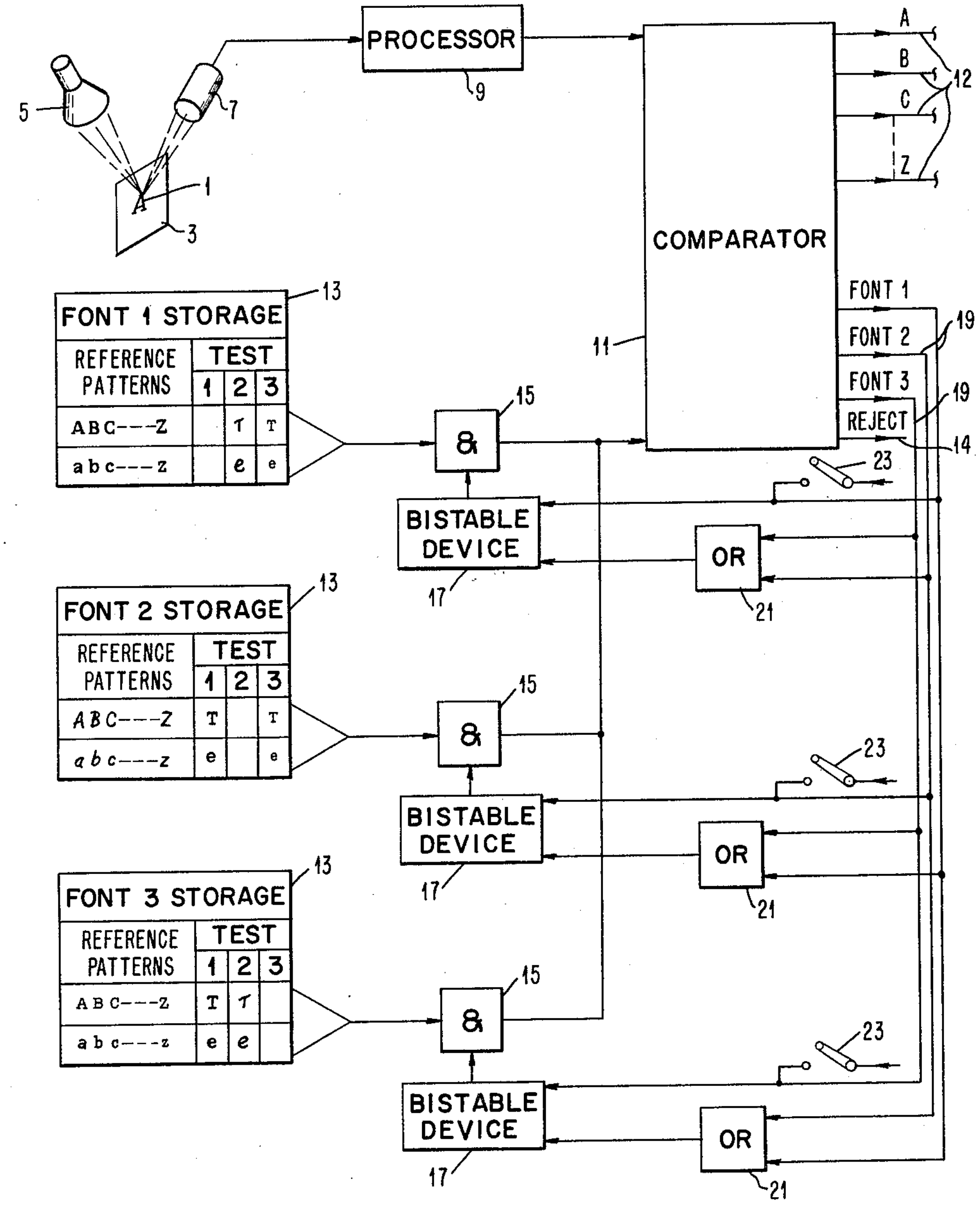
INVENTORS
JOSE REINES
GLENMORE L. SHELTON JR.
BY Francis J. Thomas
ATTORNEY United States Patent Office 3,167,746
Patented Jan. 26, 1965

3,167,746

SPECIMEN IDENTIFICATION METHODS AND APPARATUS

Jose Reines, Bronx, and Glenmore L. Shelton, Jr., Carmel, N.Y., assignors to International Business Machines Corporation, New York, N.Y., a corporation of New York Filed Sept. 20, 1962, Ser. No. 224,934
12 Claims. (Cl. 340—146.3)

This invention relates to specimen identification methods and apparatus and, more particularly, to recognition systems which automatically identify the style of the specimen and adapt to changing styles. The invention is particularly applicable to the recognition of characters on multi-font (style) printed documents and the recognition of speech in various styles (languages, accents, etc.).

A general purpose specimen identification system should have the capability of recognizing a variety of styles of input data. This may be accomplished by storing reference patterns in several styles and comparing the specimen to be identified with every reference pattern in every style. This procedure requires extensive equipment and, if the comparison is performed serially, is time consuming. However, font changes do not generally occur in the middle of words or sentences, but rather occur after entire paragraphs or pages of printed matter. Similarly, changes in accent, language, etc. do not generally occur frequently. For this reason, it is desirable to use an economical, high-speed system which compares the specimen to only a single style rather than a system which stores reference patterns from many styles and compares the specimen to this large number of patterns, and to alter the system storage when the specimen style changes.

The present invention is specifically embodied with respect to character recognition, and provides a technique of automatic type font identification and adaptation. Each reference pattern in each font to be recognized is stored in the system, but the specimen is only compared to the pattern in a single font and to a few font test patterns that are derived from the unused fonts. That is, in addition to comparing the specimen with a full set of reference patterns in the operating font, the specimen is compared to a small number of reference patterns from the remaining fonts. These additional test patterns are patterns that frequently occur in the input set of data (e.g. language) and that are found to be reliably identified and peculiar to their font. In the English language, the first criteria is met, for example, by the lower case "*e*" and the upper case "T," which occur frequently. Reliable identification and peculiarity to font are functions of the type of identification system to be used and the font styles to be recognized, and the final selection of font test patterns must be moderated by these factors.

The system adapts itself to changing font by automatically changing the reference patterns when a specimen is found to be similar to a font test pattern. The automatic adaptation is not likely to occur immediately upon font change as the similarity to a test pattern cannot be sensed until a specimen is presented to the system which matches one of the limited number of test patterns. The delay in font adaptation is minimized by selecting frequently occurring patterns for font test patterns. The system provides reject indications during this delay but the rejected specimen may be identified if again presented to the system after it has adapted itself to the changed font.

These techniques can be used for automatic adaptation of speech recognition systems, where each style (language, accent, etc.) is stored in the manner that different fonts are stored for character recognition.

An object of this invention is to provide specimen identification methods and apparatus which automatically identify the style or font of the specimen and are adaptable to changing styles or fonts.

A further object is to provide an identification system wherein specimens are compared to reference patterns in a single or limited number of styles or fonts and to style or font test patterns to provide atuomatic style or font identification and adaptation.

Another object of this invention is to provide a style or font adapting identification system wherein specimens are compared to reference patterns in a single or limited number of styles or fonts and to test patterns whose selection is based on their frequency of occurrence, reliability of identification, and peculiarity of their style or font, whereby the specimen style or font can be identified and the system adapted to the style or font.

The foregoing and other objects, features and advantages of the invention will be apparent from the following more particular description of a preferred embodiment of the invention, as illustrated in the accompanying drawing.

The single drawing is a functional diagram of a character recognition system which constitutes the preferred embodiment of the invention.

A typical character recognition system is shown at the top of the drawing, where a specimen 1 on a document 3 is scanned by a conventional flying spot scanner 5 and photosensitive device 7 to produce an electrical signal indicative of the configuration of the specimen. In a typical system this signal is applied to a processor 9 which generates a function of the signal which has properties that provide enhanced recognition. The processor output is then analyzed in a comparator 11 to provide an indication of the identity of the specimen on an output lead 12. The identification is based on a comparison of the specimen signal with a group of reference patterns. When the specimen cannot be identified, a "reject" signal is generated on a lead 14. A recognition system of this type which is suitable for use with the present invention is shown and described in detail in a copending U.S. Patent application Serial Number 45,034, filed on July 25, 1960, by Lawrence P. Horwitz and Glenmore L. Shelton, Jr., entitled Specimen Identification Apparatus and Method. In this system, the autocorrelation function of the specimen is compared to similar functions of reference patterns as the basis for identification.

The present invention utilizes several reference storage circuits 13, one for each font to be recognized. A group of "and" gates 15 determines which reference storage circuit is to supply data to the comparator 11. In the drawing, the contents of the storage circuits 13 are broadly labelled reference and test patterns, but these circuits contain the data that is encessary for the proper operation of the system. For example, when this invention is practiced in connection with the system described in the above-cited U.S. Patent application Serial Number 45,034, the storage circuits 13 contain normalized autocorrelation functions of reference patterns. However, for simplicity, the contents of the storage circuits will be referred to as "reference patterns."

Each reference storage circuit 13 contains font test patterns from each of the other fonts to be recognized. For example, the "Font 1 Storage" circuit contains test patterns "T" and "*e*" from font 2 (IBM® Selectric®-Script® 12) and font 3 (IBM Selectric-Scribe® 12) in addition to an entire set of font 1 (IBM Selectric-Delegate® 10) reference patterns. Similarly, the "Font 2 Storage" circuit contains, in addition to the font 2 reference patterns, test patterns "T" and "*e*" from fonts 1 and 3, and the "Font 3 Storage" circuit contains the patterns from fonts 1 and 2 in addition to the font 3 reference pattern.

Each "and" gate 15 is conditioned by the output signal from a bistable device 17, but only one "and" gate is conditioned at a time. The specimen is compared to the reference patterns selected by the conditioned "and" gate in the comparator 11, and an indication of the identity of the specimen, or a reject indication, is ordinarily provided. However, font test patterns are also applied to the comparator, and in case the specimen is found to be similar to a test pattern, a signal is generated on a lead 19. This signal is indicative of a change in specimen font and is used to control the bistable devices 17 to adapt the system to the new font. A bistable device, such as a flip-flop circuit, provides a two-level (binary) output signal whose value depends upon whether the device is "set" or "reset." The bistable devices are arranged to provide conditioning signals to the "and" gates 15 when set and inhibiting signals when reset. Thus, a signal on any lead 19 (indicating a change in specimen font) sets the bistable device 17 corresponding to the new font and is applied through "or" gates 21 to reset the other bistable devices.

The system can be manually set to read the specimen font by initially closing a switch 23 to apply a set signal to the corresponding bistable device 17. The switch may be left in the closed position to remove the effect of the automatic font adaptation circuits, or may be closed and reopened to initiate the system operation with the correct font while retaining the adaptive feature.

In the preferred embodiment, font test patterns "T" and "*e*" are used because they occur frequently in the English language and because they are found to be accurately identifiable and peculiar to their fonts. Obviously, other patterns which fulfill these conditions can be used or the system may be expanded to include a larger number of test patterns for each font. Similarly, the system will operate with a single test pattern for each font.

The system can obviously be extended to other forms of specimen identification. For example, speech in various styles (languages, accents, etc.) can be recognized by storing reference pattern data corresponding to the spoken words of each language in a separate storage circuit. Each storage circuit also contains test data corresponding to spoken words in the other languages to be identified and the system automatically senses a change in language and adapts to the changed language.

While the invention has been particularly shown and described with reference to a preferred embodiment thereof, it will be understood by those skilled in the art that various changes in form and details may be made therein without departing from the spirit and scope of the invention.

What is claimed is:

1. A style-adaptive specimen identification system comprising, in combination:

a plurality of storage circuits, each storing reference pattern data corresponding to the reference patterns in a style and each storing style test data corresponding to at least one style test pattern in another style;

analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

2. A font-adaptive specimen identification system comprising in combination:

a plurality of storage circuits, each storing reference pattern data corresponding to the reference patterns in a font and each storing font test data corresponding to at least one font test pattern in another font;

analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

3. A style-adaptive specimen identification system comprising, in combination:

a plurality of storage circuits, each storing reference pattern data corresponding to the reference patterns in a style and each storing style test data corresponding to at least one style test pattern in another style, where the style test pattern is chosen from among those patterns that occur relatively frequently among the specimen patterns;

analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

4. A font-adaptive specimen identification system comprising, in combination:

a plurality of storage circuits, each storing reference pattern data corresponding to the reference patterns in a font and each storing font test data corresponding to at least one font test pattern in another font, where the font test pattern is chosen from among those patterns that occur relatively frequently among the specimen patterns;

analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

5. A style-adaptive specimen identification system comprising, in combination:

a plurality of storage circuits, each storing reference pattern data corresponding to the reference patterns in a style and each storing style test data corresponding to at least one style test pattern in another style, where the style test pattern is chosen from among those patterns that are peculiar to their style, analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

6. A font-adaptive specimen identification system comprising, in combination:

a plurality of storage circuits, each storing reference pattern data corresponding to the reference patterns in a font and each storing font test data corresponding to at least one font test pattern in another font, where the font test pattern is chosen from among those patterns that are peculiar to their font, analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

7. A style-adaptive specimen identification system comprising, in combination:

a plurality of storage circuits, each storing reference pattern data corresponding to the reference patterns in a style and each storing style test data corresponding to at least one style test pattern in another style, where the configuration of the style test pattern is chosen from among those patterns that are identifiable with a relatively high degree of reliability;

analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

8. A font-adaptive specimen identification system comprising, in combination:

a plurality of storage circuits, each storing reference pattern data corresponding to the reference patterns in a font and each storing font test data corresponding to at least one font test pattern in another font, where the configuration of the font test pattern is chosen from among those patterns that are identifiable with a relatively high degree of reliability;

analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

9. A style-adaptive specimen identification system comprising, in combination:

a plurality of storage circuits, each storing reference pattern data corresponding to the reference patterns in a style and each storing style test data corresponding to at least one style test pattern in another style, where the style test pattern is chosen from among those that occur relatively frequently among the specimen patterns and that are peculiar to their style;

analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

10. A font-adaptive specimen identification system comprising, in combination:

a plurality of storage circuits, each storing reference pattern data corresponding to the reference patterns in a font and each storing font test data corresponding to at least one font test pattern in another font, where the font test pattern is chosen from among those that occur relatively frequently among the specimen patterns and that are peculiar to their font;

analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

11. A style-adaptive specimen identification system comprising, in combination:

a plurality of storage circuits, each storing reference pattern data corresponding to the reference patterns in a style and each storing style test data corresponding to at least one style test pattern in another style, where the style test pattern is chosen from among those that occur relatively frequently among the specimen patterns that are identifiable with a relatively high degree of reliability, and that are peculiar to their style;

analyzing means responsive to the specimen and to the data stored in a selected storage circuit, for providing an indication of the identity of the specimen when the specimen is similar to a reference pattern corresponding to stored reference pattern data, and for providing an indication of the specimen style when the specimen is similar to a style test pattern corresponding to stored style test data;

and selecting means, responsive to the output of the analyzing means when an indication of specimen style is provided, for selecting the storage circuit means which contains the reference patterns in the indicated style as an input to the analyzing means.

12. A font-adaptive specimen identification system comprising, in combination:

a plurality of storage circuits, each storing reference pattern data corresponding to the reference patterns in a font and each storing font test data corresponding to at least one font test pattern in another font, where the font test pattern is chosen from among those that occur relatively frequently among the specimen patterns that are identifiable with a relatively high degree of reliability, and that are peculiar to their font;

analyzing means responsive to the specimen and to the data stored in a selected storage circuit, for providing an indication of the identity of the specimen when the specimen is similar to a reference pattern corresponding to stored reference pattern data, and for providing an indication of the specimen font when the specimen is similar to a font test pattern corresponding to stored font test data;

and selecting means, responsive to the output of the analyzing means when an indication of specimen font is provided, for selecting the storage circuit means which contains the reference patterns in the indicated font as an input to the analyzing means.

No references cited.